(12) United States Patent
Zhang et al.

(10) Patent No.: US 11,599,434 B2
(45) Date of Patent: Mar. 7, 2023

(54) SYSTEM FOR RECOMMENDING TESTS FOR MOBILE COMMUNICATION DEVICES MAINTENANCE RELEASE CERTIFICATION

(71) Applicant: T-Mobile USA, Inc., Bellevue, WA (US)

(72) Inventors: Xiao Zhang, Sammamish, WA (US); Wei Huang, Bellevue, WA (US); Pei Zheng, Sammamish, WA (US); Johnderic V. Sicat, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/125,602

(22) Filed: Dec. 17, 2020

(65) Prior Publication Data

US 2022/0197765 A1   Jun. 23, 2022

(51) Int. Cl.
*G06F 11/00* (2006.01)
*G06F 11/22* (2006.01)
*G06F 11/263* (2006.01)
*G06F 11/277* (2006.01)

(52) U.S. Cl.
CPC ...... *G06F 11/2252* (2013.01); *G06F 11/2273* (2013.01); *G06F 11/2294* (2013.01); *G06F 11/263* (2013.01); *G06F 11/277* (2013.01)

(58) Field of Classification Search
CPC ............. G06F 11/2252; G06F 11/2273; G06F 11/263; G06F 11/277; G06F 11/368; G06F 11/3684
See application file for complete search history.

(56) References Cited

U.S. PATENT DOCUMENTS

| 2006/0259629 | A1* | 11/2006 | Usmani | G06F 11/3688 709/227 |
| 2011/0246834 | A1* | 10/2011 | Rajashekara | G06F 11/3676 714/E11.208 |
| 2012/0221283 | A1* | 8/2012 | Lee | G06F 11/3676 702/119 |
| 2017/0199810 | A1* | 7/2017 | Hamilton, II | G06F 11/3684 |
| 2018/0095869 | A1* | 4/2018 | Peer | G06F 11/3664 |
| 2019/0294531 | A1* | 9/2019 | Avisror | G06F 11/3676 |

* cited by examiner

*Primary Examiner* — Philip Guyton
(74) *Attorney, Agent, or Firm* — Lee & Hayes, P.C.

(57) ABSTRACT

Techniques for automatically selecting device tests for testing devices configured for operation in wireless communication networks, based upon maintenance releases (MRs) received from original equipment manufacturers. When an MR with changes for a device is received, the MR may be analyzed in order to determine what the changes pertain to with respect to the device. The changes may be clustered with respect to requirements for the changes and a knowledge base may be consulted by a recommendation engine in order to determine candidate tests for testing the MR. The candidate tests may be based upon previous tests, failed tests and, relevant tests. Based at least in part on the identified previous tests, failed tests and relevant tests, one or more tests may be selected for testing devices with respect to the newly received MR.

20 Claims, 5 Drawing Sheets

SYSTEM FOR RECOMMENDING TESTS FOR MOBILE COMMUNICATION DEVICES MAINTENANCE RELEASE CERTIFICATION

BACKGROUND

Mobile communication devices configured for operation in wireless communication networks, e.g., handset devices such as mobile phones, are often updated, fixed, patched, etc., by an original equipment manufacturer (OEM) once the mobile communication devices are deployed for use in a wireless communication network. For example, OEMs release hundreds of software updates for the mobile communication devices every year to add features, fix bugs, and improve security as well as stability. Such releases are generally referred to as maintenance releases (MRs) and need to be tested and certified by the operator of the wireless communication network before being released to the mobile communication devices. This is to help ensure that MRs do not impact the user experience.

There are generally 400 or more MRs released every year from OEMs. Additionally, there are 7000 or more candidate tests to run for each MR. Currently, test selection is handled manually by subject matter experts (SMEs). However, it is impossible to run all the candidate tests for MRs because of cost, required effort and time constraints to certify a new MR. Therefore, a subset of tests needs to be selected and prioritized based on test importance, necessity and cost effectiveness, where the subset of tests is able to identify potential faults and risks with a new MR. Currently, the MRs with changes are received from OEMs and SMEs review the MRs. The SMEs may then meet and discuss the MRs and candidate tests for the MR. The tests are then manually selected by the SMEs for execution. However, this results in limited capability to identify tests that may capture defects. Additionally, such a procedure has limited scalability.

Manual test case selection is subjective since it is influenced by bias and opinions of individual SMEs and many times does not fully leverage other sources of information such as test history and defect database, which results in inefficiency for fault detection. For example, failed tests from a previous MR certification may not be manually selected for retesting in certifying a new MR. Furthermore, since there are no unified selection criteria for manual test selection, results from manual test selection for certifying a MR may produce results that are inconsistent. For example, if a first SME chooses tests A, B, and C while a second SME chooses tests B, D, and E, different test results may be obtained based at least on the fact that some of the test that were performed were different. Thus, manual selection of tests may be inefficient for detecting faults with respect to MRs. Additionally, there is currently no clear matching logic between tests and requirements. For example, different tests may be chosen for similar changes in subsequent MRs. Thus, no standard criteria is available for technical approval (TA) for MRs. Indeed, TAs may include nearly 50 percent failed tests in subsequent MRs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
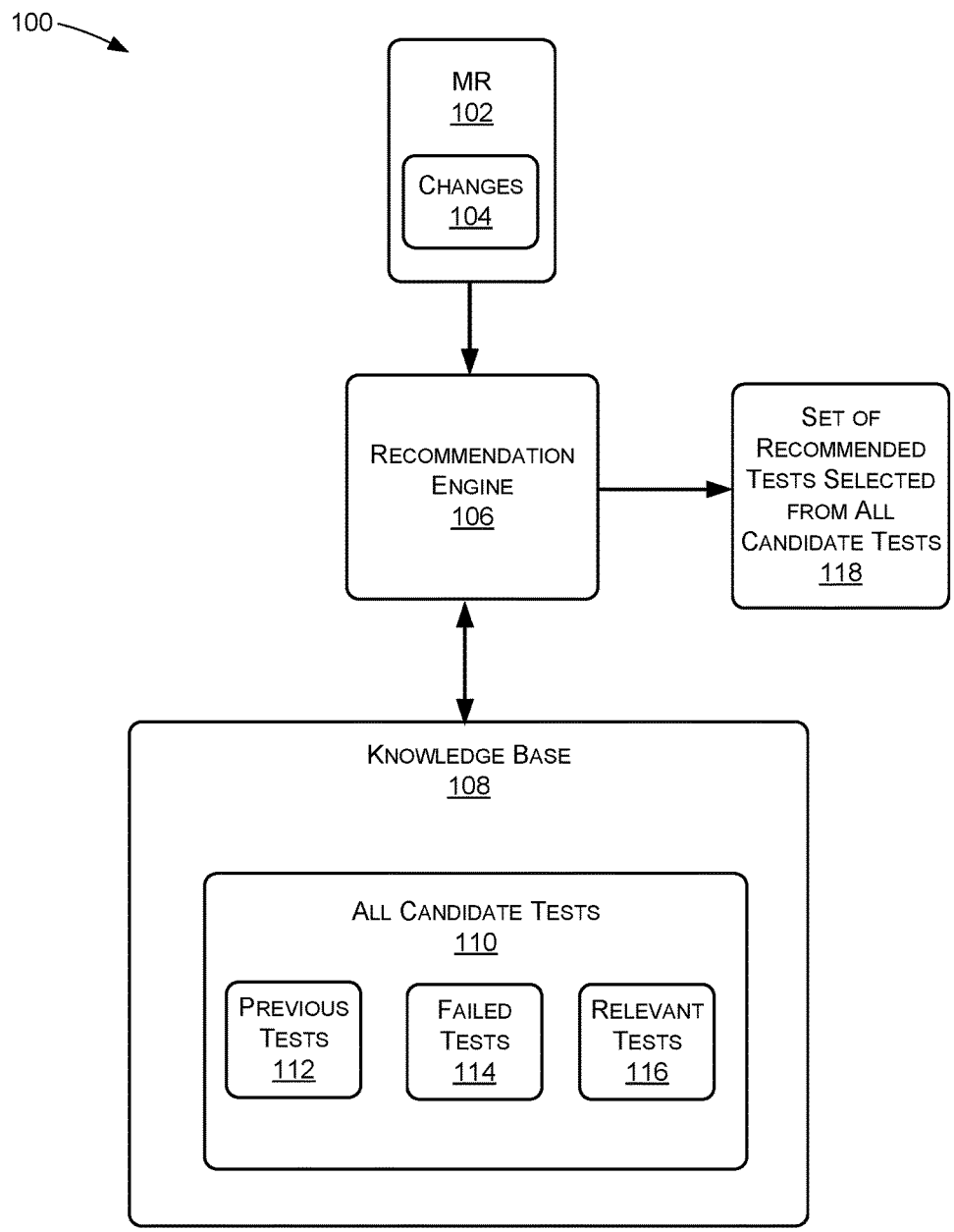
FIG. 1 schematically illustrates an overview of a process for automatically selecting device tests for testing devices, e.g., mobile communication devices, configured for operation in wireless communication networks, based upon MRs received from OEMs.

Described herein are techniques and architecture for automatically selecting device tests for testing devices, e.g., mobile communication devices, configured for operation in wireless communication networks, based upon MRs received from OEMs. The test selection may be data driven. For example, when an MR with changes for a device is received, the MR may be analyzed in order to determine what the changes pertain to with respect to the device. The changes may relate to changes in performance and/or functionality of the devices. The changes may be clustered with respect to requirements for the changes and a knowledge base may be consulted by a recommendation engine in order to determine candidate tests for testing the MR. The candidate tests may be based upon previous tests that were performed and correlated with historical tests with respect to similar MRs previously received and tested. Additionally, failed tests may be identified where the failed tests were previously conducted on devices based upon similar MRs having similar changes to the newly received MR. Based upon the MRs and the changes contained therein, relevant tests may be identified. Based at least in part on the identified previous tests, failed tests and relevant tests, one or more tests may be selected for testing devices with respect to the newly received MR.

In particular, a knowledge base may be created. The knowledge base may include various forms of data. The data may include requirements for changes within previous MRs. The requirements may be obtained by parsing the MRs to extract the requirements. A natural language processing (NLP) or other type of machine learning algorithm may be used for the requirement extraction. The requirements may then be clustered based upon the text extraction. The requirements may be clustered into multiple clusters. For example, in configurations, four clusters may be defined. A first cluster may relate to and include changes in MRs that relate to major fixes. A second cluster may include and relate to changes in MRs directed to security updates. A third cluster may relate to and include changes directed to a screen or display for devices, as well as for gaming. Finally, a fourth cluster may relate to a particular device, e.g., brand of the device.

The knowledge base may also include data related to test histories. For example, the test histories may include tests directed to particular changes, particular devices, etc., that were previously run. The test history may also include "risky" tests, e.g., tests that previously failed based upon similar changes or requirements with respect to previous MRs. Additionally, the knowledge base may include test reports from OEMs. Such test reports may be provided by OEMs relating to tests performed by the OEMs with respect to MRs and may include results of such tests. These test reports may be deemed a high priority because the tests are generally directed by the OEMs to the particular changes within the MRs.

The knowledge base may take the clusters of requirements and map the clusters of requirements to potential tests. This may provide a cluster of potential tests for each of the clusters of requirements. Additionally, the knowledge base may include a multi-criteria test prioritization. The prioritization may be based upon, for example, popularity of potential tests, and the history of potential tests. For example, the history may include a failed test history with respect to previous changes and/or MRs.

A recommendation engine may access the knowledge base when a new MR for a device is received. For example, a new MR may be received from an OEM. The new MR may be text extracted to retrieve requirements related to changes for the device provided in the MR. The requirements may be clustered based upon the clusters of requirements within the knowledge base. Prioritized tests for the requirement cluster may be retrieved from the potential test data base that have been prioritized based upon multiple criteria. The prioritized tests may be based upon the multi-criteria test prioritization performed by the knowledge base.

The recommendation engine may search the potential test database based upon the prioritized tests for the cluster(s), as well as relevant tests, risky tests, e.g., previous tests related to previous MRs directed to similar requirements and changes. The tests may be analyzed based upon their priority, as well as their relevance. Execution time for each test may be considered, as well as the technology protocol with respect to the device, e.g., 5G New Radio (NR), 4G LTE, etc. Additionally, the technology of the device may also be considered, as well as the OEM, e.g., the brand.

Based upon the prioritized tests, the previous tests, the relevant tests, the technology protocol, the OEM and technology, a set of recommended tests may be determined by the recommendation engine. Based upon the execution time of the recommended tests, a total execution time may be determined. If the total execution time exceeds a predetermined threshold, then the recommendation engine may reduce the number of selected tests. The tests that are removed from the selected set of recommended tests may be the lower prioritized tests.

Once the set of recommended tests is finalized, the finalized set of recommended tests may be provided to the OEM for execution of the tests. Additionally, or alternatively, the OEM may evaluate the finalized set of selected tests and provide a list of tests for the operator of the wireless communication network to perform, where the set of tests is based at least in part on the set of tests determined by the recommendation engine. In configurations, the operator of a wireless network may simply perform the tests included within the finalized set of recommended tests selected by the recommendation engine, e.g., no input from the OEM may be solicited and received by the operator of the wireless communication network.

In configurations, the finalized set of recommended tests may be provided back to the knowledge base for use for the requirement test mapping. Likewise, the newly received MR may be provided to the database of MRs within the knowledge base, along with the extracted requirements for updating the knowledge base.

Thus, the MRs may be processed by extracting requirements utilizing NLP, or some other form of machine learning, and clustering the requirements. The requirement extraction may include extracting key words from the MR documents. A document term matrix may be created that ranks the extracted key words based on importance. The requirement clustering may then include grouping the MR documents based on similarity. As previously noted, the clusters may have various categories including, but not limited to, major fixes, security updates, display or screen attributes, gaming attributes, device type, technology protocol, brand of the device, etc.

The set of recommended tests may be based upon multiple criteria, including important tests, risky (e.g., previously failed) tests, and relevant tests. For example, important tests may be selected based on the requirements of the new MR and the knowledge base. The risky tests may be selected based on test history and/or an OEM test report related to tests performed on devices based upon previous similar changes. Generally, such risky tests may be selected based upon a history of failed tests related to the changes in the new MR. Finally, relevant tests may be searched based on features and change key words in the processed, e.g., parsed, MR. The important tests, risky tests, and relevant tests that are selected are then combined into a set of recommended tests.

In configurations, the recommendation, e.g., the set of recommended tests, may be evaluated based on various factors. For example, the set of recommended tests may be evaluated based on precision and recall. The precision may relate to tests from the set of recommended tests that are finally selected by the OEM and/or the operator of the wireless communication network. The recall may relate to the true positive over observation, e.g., additional tests that may be added by the OEM or the operator of the wireless communication network. A low precision (false positive) generally leads to too many tests being performed and a wasted expenditure of resources. A low recall (a false negative) may miss important tests that need to be performed.

Another way in which the set of recommended tests may be evaluated includes fault detection percentage (FDP). The FDP may be defined as test failure in recommended tests divided by the recommended tests. The FDP represents a portion of recommendations that has faults. A higher FDP indicates a better ability to capture risky tests, e.g., previously failed tests, by the recommendation engine in the recommendation of tests.

Another manner in which the set of recommended tests may be evaluated includes use of subject matter experts (SMEs). This may include validating recommendation logics, validating the necessity of false negative tests (not recommended but observed), and validating reasoning of false positive tests (recommended tests but not observed).

Thus, the techniques and systems described herein involve processing MRs to extract requirements. A test history and/or known defects, e.g., previously failed tests, along with the extracted MRs may be combined and placed within a knowledge base. The recommendation engine may then analyze received MRs and utilize the knowledge base to determine a set of recommended tests. The recommended tests may then be provided to the OEM of the device and/or the operator of the wireless communication network, e.g., subject matter experts (SMEs). The OEM and/or the operator of the wireless communication network may determine tests to perform from the set of recommended tests, as well as any additional test(s) to perform not included in the set of recommended tests, to determine a set of tests to be performed. The set of tests may then be performed with respect to the proposed requirements/changes within the received MRs. If the tests pass, then the received MRs may be certified and the changes in the received MRs may be certified and implemented in devices used within the wireless communication network. In configurations, a predetermined threshold number of tests, e.g., 70 percent, 80 percent, etc., that pass may be deemed sufficient for implementation of the changes within the MR.

A test knowledge base is thus developed using natural language processing and machine learning and data is collected through a unified platform to provide digital data that may be utilized by the knowledge base and the recommendation engine thereby leading to much quicker and more efficient selection of tests and the execution of the tests. Use of the recommendation engine and the knowledge base may lead to improved device test capability and scalability. The implementation of the recommendation engine and knowledge base may generally lead to generic and scalable solutions to provide objective recommendations, as opposed to subjective recommendations. The use and limitation of the recommendation engine and knowledge base may also accelerate learning curves of engineers in their training to become SMEs.

FIG. 1 schematically illustrates an overview of an example process 100 for automatically selecting device tests for testing devices, e.g., mobile communication devices, configured for operation in wireless communication networks, based upon MRs received from OEMs. The test selection may be data driven. For example, when an MR 102 with changes 104 for a device is received, the MR 102 may be analyzed in order to determine what the changes 104 pertain to with respect to devices. The changes 104 may relate to changes in features, performance and/or functionality of the devices including the addition or removal of features of the devices. The changes 104 may be clustered with respect to requirements for the changes 104 and a recommendation engine 106 may consult a knowledge base 108 in order to search a database of all candidate tests 110 for testing the MR 102 with respect to devices. The candidate tests 110 may be based upon previous tests 112 that were performed and correlated with historical tests with respect to similar MRs previously received and tested. The previous tests 112 may be tests that have been performed frequently with respect to previous MRs and thus, may be deemed to be important tests. Additionally, failed tests 114 may be identified as candidate tests 110, where the failed tests were previously conducted on devices based upon similar MRs having similar changes to the newly received MR. Based upon the MRs and the changes contained therein, relevant tests 116 may be identified as candidate tests. Based at least in part on the identified previous tests 112, failed tests 114 and relevant tests 116, one or more tests may be selected by the recommendation engine 106 as recommended tests 118 for testing devices with respect to the received MR 102.

Figure 2:
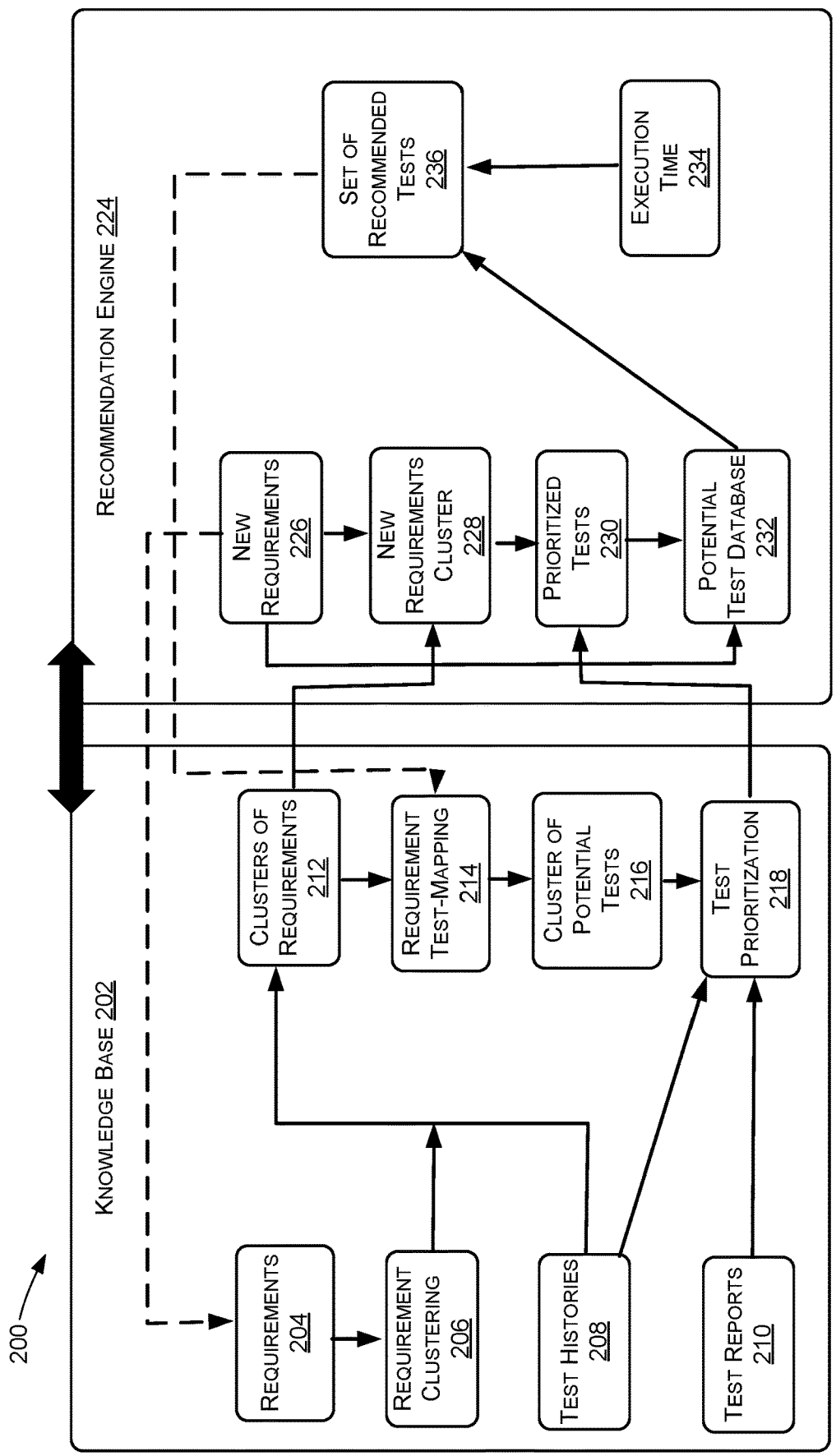
FIG. 2 schematically illustrates an example workflow for the example process of FIG. 1.

Referring to FIG. 2, an example workflow 200 for the example process 100 is schematically illustrated. A knowledge base 202 may be created, where the knowledge base 200 is at least similar to the knowledge base 108 of FIG. 1. The knowledge base 202 may include various forms of data. The data may include requirements for changes 204 within previous MRs. Requirement clustering 206 may be performed. The requirements 204 may be obtained by parsing the previous MRs to extract the requirements. A natural language processing (NLP) or other type of machine learning algorithm may be used for the requirement extraction. A document term matrix may be created that ranks the extracted key words based on importance. The requirements may then be clustered based upon the text extraction and the document term matrix. The requirements may be clustered into multiple clusters. For example, in configurations, four clusters may be defined. A first cluster may relate to and include changes in MRs that relate to major fixes. A second cluster may include and relate to changes in MRs directed to security updates. A third cluster may relate to and include changes directed to a screen or display for devices, as well as for gaming. Finally, a fourth cluster may relate to a particular device, e.g., brand of the device.

The knowledge base 202 may also include data related to test histories 208. For example, the test histories may include tests directed to particular changes, particular devices, etc., that were previously run. The test histories 208 may also include "risky" tests, e.g., tests that previously failed based upon similar changes or requirements with respect to previous MRs. Additionally, the knowledge base 202 may include test reports 210 from OEMs. Such test reports 210 may be provided by OEMs relating to tests performed by the OEMs with respect to MRs and may include results of such tests. These test reports may be deemed a high priority because the tests are generally directed by the OEMs to the particular changes within the MRs.

The knowledge base 202 may take clusters of requirements 212 and perform requirement-test mapping 214 and map the clusters of requirements 212 to potential tests. This may provide one or more clusters of potential tests 216 for each of the clusters of requirements 212. Additionally, the knowledge base 202 may perform a multi-criteria test prioritization 218. The prioritization may be based upon, for example, the test histories 208, the test reports 210, popularity of potential tests, etc. For example, the test histories 208 may include a failed test history with respect to previous changes and/or MRs.

Thus, the knowledge base 202 creates a database of previous MRs and their respective changes, as well as a database of candidate tests, e.g., candidate tests 110 of FIG. 1. The knowledge base 202 clusters the changes into the clusters of requirements 212 for the changes and determines clusters of potential tests 216 for the clusters of requirements 212 based on test histories 208 and OEM test reports 210. The tests within the clusters of potential tests 216 may be prioritized based on factors such as, for example, popularity, failed test histories, etc.

A recommendation engine 224 may access the knowledge base 202 when a new MR for devices is received. For example, a new MR may be received from an OEM. The new MR may be text extracted to retrieve new requirements 226 related to changes for the device provided in the MR. The new requirements 226 may be clustered 228 into one or more clusters based upon the clusters of requirements 212 within the knowledge base 202. Prioritized tests 230 for the new requirements cluster 228 may be retrieved from the prioritized test data base 218 that have been prioritized based upon multiple criteria. The prioritized tests 230 may be based upon the multi-criteria test prioritization 218 performed by the knowledge base 202.

The recommendation engine 224 may also search a potential test database 232 based upon extracted key words in the new requirement cluster(s) 228 and the prioritized tests 230 for the new requirements cluster(s) 228, as well as previous tests, relevant tests, and risky tests, e.g., previously failed tests related to previous MRs directed to similar requirements and/or changes present in the new MR. The tests may be analyzed based upon their priority with respect to the new cluster(s) 228, as well as their relevance to changes in the new MR. Execution time 234 for each test may be considered, as well as the technology protocol with respect to the device, e.g., 5G New Radio (NR), 4G LTE, etc. Additionally, the OEM, e.g., the brand, of the device may also be considered. In configurations, the potential test database 232 may be included within the knowledge base 202 and may include all candidate tests and may be organized into clusters of potential tests, e.g., clusters of potential tests 216 based on the clusters of requirements 212 and the requirement test-mapping.

Based upon one or more of the prioritized tests, the previous tests, the failed tests, the relevant tests, the technology protocol, the OEM and technology, a set of recommended tests 236 may be selected by the recommendation engine 224, e.g., the set of recommended tests 118 of FIG. 1. Based upon the total execution time of the set of recommended tests 236, a total execution time may be determined. If the total execution time exceeds a predetermined threshold, then the recommendation engine 224 may reduce the number of recommended tests in the set of recommended tests 236. The tests that are removed from the selected set of recommended tests 230 may be lower prioritized tests.

Once the set of recommended tests 236 is finalized, the finalized set of recommended tests 236 may be provided to the OEM for execution of the tests. Additionally, or alternatively, the OEM may evaluate the finalized set of recommended tests and provide a list of tests for the operator of the wireless communication network to perform, where the list of tests is based at least in part on the set of recommended tests determined by the recommendation engine 224. In configurations, the operator of a wireless network may simply perform the tests included within the set of recommended tests 236 selected by the recommendation engine 224, e.g., no input from the OEM may be solicited and received by the operator of the wireless communication network.

In configurations, the finalized set of recommended tests may be provided back to the knowledge base 202 for use for the requirement test mapping 214. Likewise, the newly received MR may be provided to a database of MRs within the knowledge base 202, along with the extracted requirements from the new MR, for updating the knowledge base 202.

Figure 3:
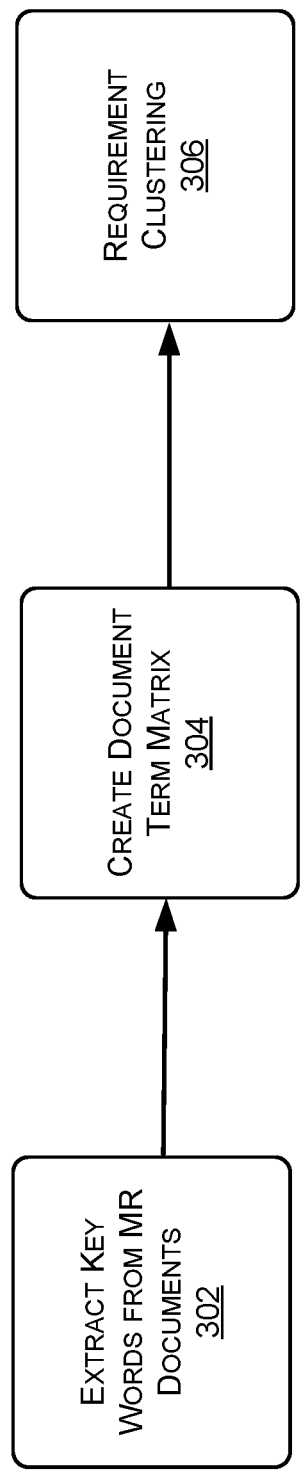
FIG. 3 schematically illustrates requirement clustering of the MRs.

Thus, referring to FIG. 3, the requirement clustering of the MRs may be performed by extracting key words, at 302, related to requirements utilizing NLP, or some other form of machine learning, and clustering the requirements. A document term matrix may be created 304 that ranks the extracted key words based on importance. The requirement clustering 306 may then include grouping the MR documents based on similarity. As previously noted, the clusters may have various categories including, but not limited to, major fixes, security updates, display or screen attributes, gaming attributes, device type, technology protocol, brand of the device, etc.

The set of recommended tests 236 may be based upon multiple criteria, including important tests, risky (e.g., previously failed) tests, and relevant tests. For example, important tests may be selected based on the requirements of the new MR and the knowledge base 202. The risky tests may be selected based on test history 208 and/or an OEM test report 210 related to tests performed on devices based upon previous similar changes. Generally, such risky tests may be selected based upon a history of failed tests related to the changes in the new MR. Finally, relevant tests may be searched based on features and key words related to the changes in the processed, e.g., parsed, MR. The selected important tests, risky tests, and relevant tests that are selected are then combined into the set of recommended tests 236.

In configurations, the recommendation, e.g., the set of recommended tests 236, may be evaluated based on various factors. For example, the set of recommended tests may be evaluated based on precision and recall. The precision may relate to tests from the set of recommended tests that are finally selected by the OEM and/or the operator of the wireless communication network. The recall may relate to the true positive over observation, e.g., additional tests that may be added by the OEM or the operator of the wireless communication network. A low precision (false positive) generally leads to too many tests being performed and a wasted expenditure of resources. A low recall (a false negative) may miss important tests that need to be performed.

Another way in which the set of recommended tests 236 may be evaluated includes fault detection percentage (FDP). The FDP may be defined as test failure in recommended tests divided by the recommended tests. The FDP represents a portion of recommendations that has faults. A higher FDP indicates a better ability to capture risky tests, e.g., previously failed tests, by the recommendation engine in the recommendation of tests.

Another manner in which the set of recommended tests 236 may be evaluated includes use of subject matter experts (SMEs). This may include validating recommendation logics, validating the necessity of false negative tests (not recommended but observed), and validating reasoning of false positive tests (recommended tests but not observed).

Thus, the techniques and systems described herein involve processing MRs to extract requirements. Test histories and/or known defects, e.g., previously failed tests, along with the extracted MRs may be combined and placed within the knowledge base 202. The recommendation engine 224 may then analyze received MRs and utilize the knowledge base 202 to determine the set of recommended tests 236. The recommended tests may then be provided to the OEM of the device and/or the operator of the wireless communication network, e.g., subject matter experts (SMEs). The OEM and/or the operator of the wireless communication network may determine tests to perform from the set of recommended tests 236, as well as any additional test(s) to perform not included in the set of recommended tests 236, to determine a set of tests to be performed. The set of tests may then be performed with respect to the proposed requirements/changes within the received MRs. If the tests pass, then the received MRs may be certified and the changes in the received MRs may be implemented in devices used within the wireless communication network. In configurations, a predetermined threshold number of tests, e.g., 70 percent, 80 percent, etc., that pass may be deemed sufficient for implementation of the changes within the MR.

The test knowledge base 202 is thus developed using natural language processing and machine learning and data is collected through a unified platform to provide digital data that may be utilized by the knowledge base and the recommendation engine 224 thereby leading to much quicker and more efficient selection of tests and the execution of the tests. Use of the recommendation engine 224 and the knowledge base 202 may lead to improved device test capability and scalability. The implementation of the recommendation engine 224 and knowledge base 202 may generally lead to generic and scalable solutions to provide objective recommendations, as opposed to subjective recommendations. The use and limitation of the recommendation engine 224 and knowledge base 202 may also accelerate learning curves of engineers in their training to become SMEs.

Figure 4:
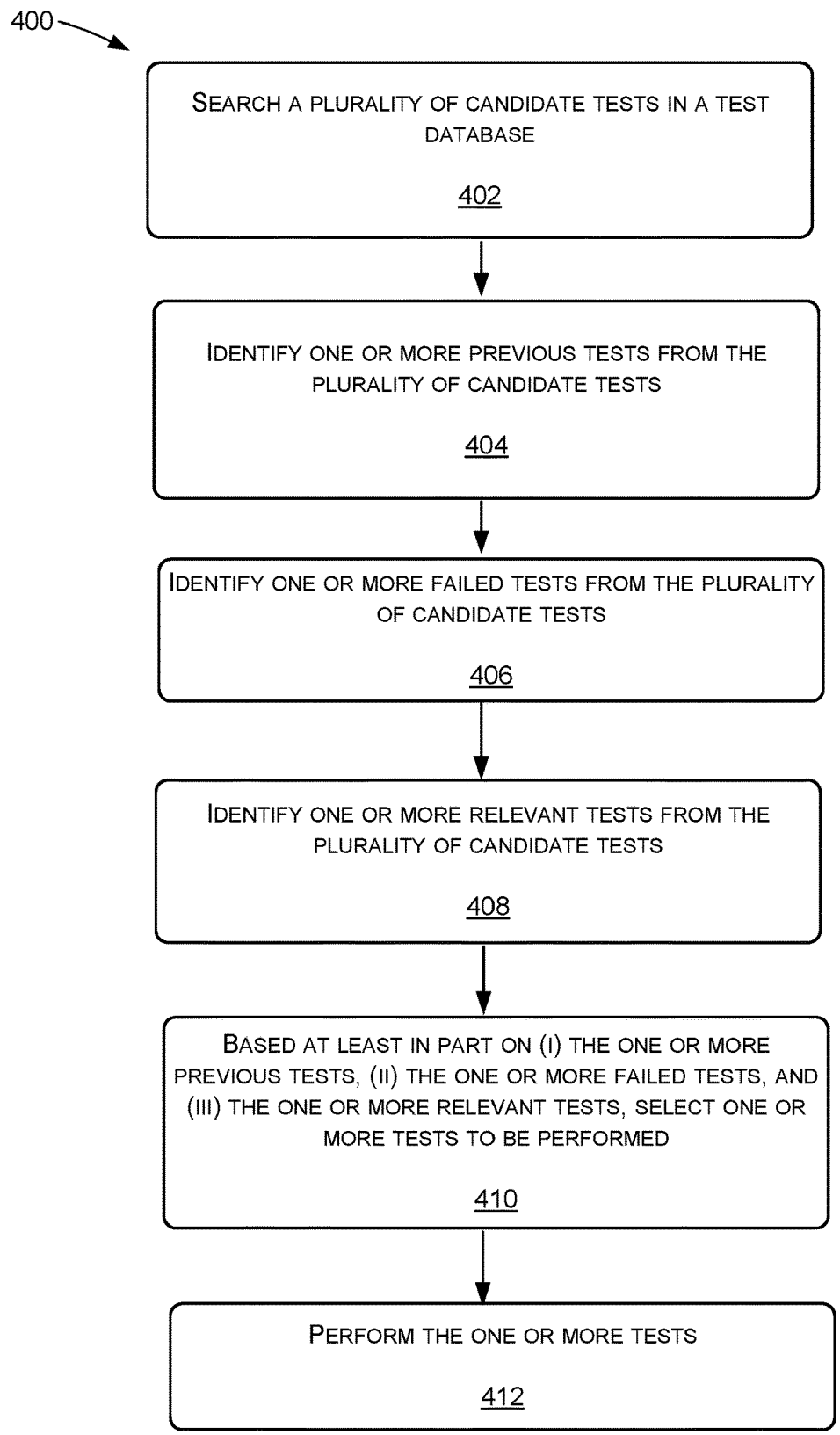
FIG. 4 is a flow diagram illustrating an example method for automatically selecting device tests for testing devices, e.g., mobile communication devices, configured for operation in wireless communication networks.

FIG. 4 is a flow diagram of an illustrative process that may be implemented within or in association with the knowledge base 108, 202 and the recommendation engine 106, 224. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks and mobile devices, the architectures and techniques are equally applicable to processor(s) and processing cores in other environments and computing device.

FIG. 4 illustrates an example method 400 for automatically selecting device tests for testing devices, e.g., mobile communication devices, configured for operation in wireless communication network. The example method 400 may be performed based at least in part on receiving a maintenance release from an original equipment manufacturer for a device. At block 402, a plurality of candidate tests stored in a test database is searched. For example, the knowledge base 202 and/or the potential test database 232 may be searched by the recommendation engine 224.

At block 404, one or more previous tests from the plurality of candidate tests are identified. The one or more previous have been previously conducted on the device in response to one or more previous maintenance releases from the original equipment manufacturer for the device.

At block 406, one or more failed tests from the plurality of candidate tests are identified. The one or more failed tests have been previously conducted on the device. At block 408, one or more relevant tests from the plurality of candidate tests are identified.

At block 410, based at least in part on (i) the one or more previous tests, (ii) the one or more failed tests, and (iii) the one or more relevant tests, one or more tests to be performed are selected. At block 412, the one or more tests are performed.

Figure 5:
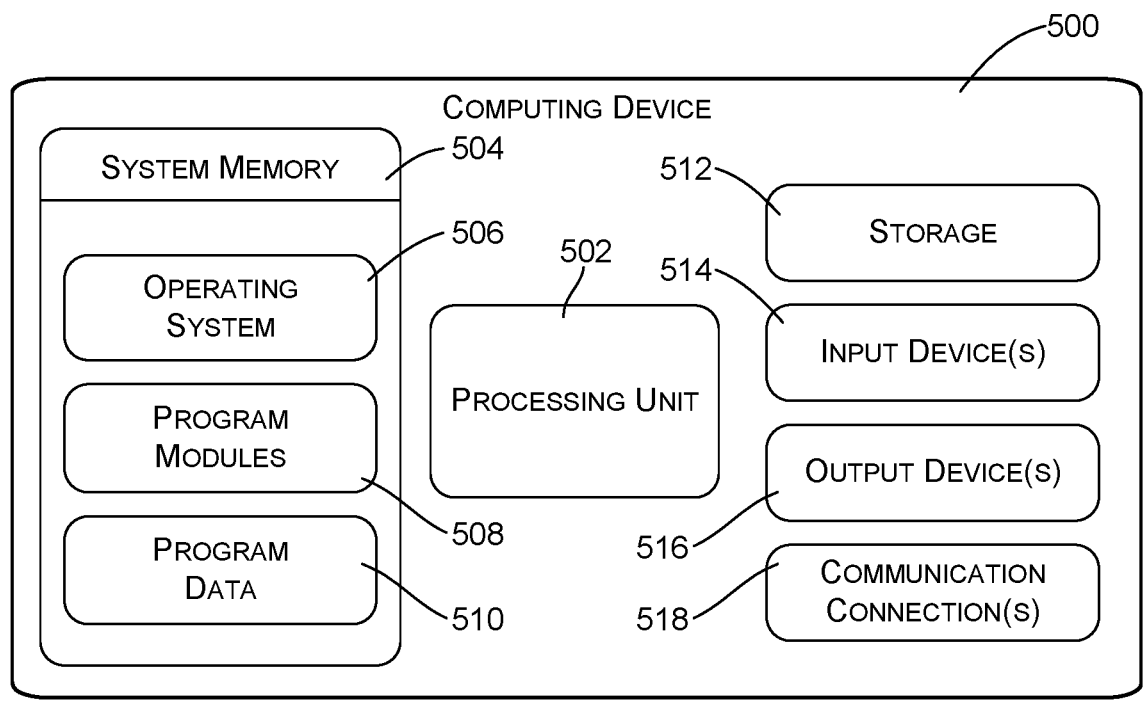
FIG. 5 is a block diagram of an example computing device that may be used to implement various functionality described herein.

FIG. 5 is a block diagram of an illustrative computing device 500 that may be used to implement various components of a cellular communication system, such as servers, routers, gateways, administrative components, etc. One or more computing devices 500 may be used to implement the knowledge base 202 and/or the recommendation engine 224, for example.

In various embodiments, the computing device 500 may include at least one processing unit 502 and system memory 504. Depending on the exact configuration and type of computing device, the system memory 504 may be volatile (such as RAM), nonvolatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage devices are illustrated in FIG. 5 as storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the functionality described above as being implemented by the knowledge base 108, 202 and/or the recommendation engine 106, 224.

The computing device 500 may also have input device(s) 514 such as a keyboard, a mouse, a touch-sensitive display, voice input device, etc. Output device(s) 516 such as a display, speakers, a printer, etc., may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A system comprising:
   one or more processors; and
   one or more non-transitory storage media comprising instructions stored thereon, the instructions being executable by the one or more processors to cause the processors to perform actions comprising:
   based at least in part on receiving a maintenance release from an original equipment manufacturer for a device configured for operation in a wireless communication network:
   searching a plurality of candidate tests stored in a test database;
   identifying one or more previous tests from the plurality of candidate tests, the one or more previous tests having been previously conducted on the device in response to one or more previous maintenance releases from the original equipment manufacturer for the device;
   identifying one or more failed tests from the plurality of candidate tests, the one or more failed tests having been previously conducted on the device;
   identifying one or more relevant tests from the plurality of candidate tests;
   based at least in part on (i) the one or more previous tests, (ii) the one or more failed tests, and (iii) the one or more relevant tests, selecting a plurality of recommended tests of the plurality of tests;

determining a total time of the plurality of recommended tests exceeds a threshold time;
in response to determining the total time of the plurality of recommended tests exceeds the threshold time:
prioritizing the plurality of recommended tests; and
determining a plurality of prioritized tests to be performed by eliminating one or more lowest priority tests from the plurality of recommended tests; and
performing, on the device, the plurality of prioritized tests to be performed.

2. The system of claim 1, wherein the one or more relevant tests are identified based at least in part on changes in functionality of the device provided in the maintenance release.

3. The system of claim 1, wherein the one or more relevant tests are identified based at least in part on changes in performance of the device provided in the maintenance release.

4. The system of claim 1, wherein the one or more failed tests are identified based at least in part on past defects in the device.

5. The system of claim 1, wherein the one or more failed tests are identified based at least in part on a test failure history of the device.

6. The system of claim 1, wherein the one or more previous tests are identified based at least part on previous changes for the device provided in the one or more previous maintenance releases correlated with historical tests.

7. The system of claim 1, wherein the actions further comprise:
determining the total time of the plurality of recommended tests based at least in part on test execution time for each of the one or more tests.

8. The system of claim 1, wherein the actions further comprise:
selecting the plurality of recommended tests based at least in part on a technology protocol of operation in the wireless communication network.

9. A computer-implemented method based at least in part on receiving a maintenance release from an original equipment manufacturer for a device configured for operation in a wireless communication network, the method comprising:
searching a plurality of candidate tests stored in a test database;
identifying one or more previous tests from the plurality of candidate tests, the one or more previous tests having been previously conducted on the device in response to one or more previous maintenance releases from the original equipment manufacturer for the device;
identifying one or more failed tests from the plurality of candidate tests, wherein the one or more failed tests are identified based fault detection percentages, the one or more failed tests having higher fault detection percentages than other tests of the plurality of candidate tests;
identifying one or more relevant tests from the plurality of candidate tests;
based at least in part on (i) the one or more previous tests, (ii) the one or more failed tests, and (iii) the one or more relevant tests, selecting a plurality of recommended tests from the plurality of candidate tests;
determining a total time of the plurality of recommended tests exceeds a threshold time;
in response to determining the total time of the plurality of recommended tests exceeds the threshold time:
prioritizing the plurality of recommended tests; and
determining a plurality of prioritized tests to be performed by eliminating one or more lowest priority tests from the plurality of recommended tests; and
performing plurality of prioritized tests to be performed on the device.

10. The computer-implemented method of claim 9, wherein the one or more relevant tests are identified based at least in part on changes in functionality of the device provided in the maintenance release.

11. The computer-implemented method of claim 9, wherein the one or more relevant tests are identified based at least in part on changes in performance of the device provided in the maintenance release.

12. The computer-implemented method of claim 9, wherein the one or more failed tests are identified based at least in part on past defects in the device.

13. The computer-implemented method of claim 9, wherein the one or more failed tests are identified based at least in part on a test failure history of the device.

14. The computer-implemented method of claim 9, wherein the one or more previous tests are identified based at least part on previous changes for the device provided in the one or more previous maintenance releases correlated with historical tests.

15. The computer-implemented method of claim 9, further comprising:
determining the total time of the plurality of recommended tests based at least in part on test execution time for each of the one or more tests.

16. The computer-implemented method of claim 9, further comprising:
selecting the plurality of recommended tests based at least in part on a technology protocol of operation in the wireless communication network.

17. One or more non-transitory storage media comprising instructions stored thereon, the instructions being executable by one or more processors to cause the processors to perform actions comprising:
based at least in part on receiving a maintenance release from an original equipment manufacturer for a device configured for operation in a wireless communication network:
searching a plurality of candidate tests stored in a test database;
identifying one or more previous tests from the plurality of candidate tests based on requirements derived from the maintenance release and on the test database, the one or more previous tests having been previously conducted on the device in response to one or more previous maintenance releases from the original equipment manufacturer for the device;
identifying one or more failed tests from the plurality of candidate tests, the one or more failed tests having been previously conducted on the device, wherein the identifying of the one or more failed tests is based upon changes to the previous maintenance releases from the original equipment manufacturer for the device, the changes being similar to changes in the maintenance release;
identifying one or more relevant tests from the plurality of candidate tests based on features and change key words parsed from the maintenance release;
based at least in part on (i) the one or more previous tests, (ii) the one or more failed tests, and (iii) the one or more relevant tests, selecting a plurality of tests to be performed; and performing the plurality of tests to be performed on the device.

18. The one or more non-transitory storage media of claim 17, wherein the one or more relevant tests are identified based at least in part on changes in functionality of the device provided in the maintenance release.

19. The one or more non-transitory storage media of claim 17, wherein the one or more relevant tests are identified based at least in part on changes in performance of the device provided in the maintenance release.

20. The one or more non-transitory storage media of claim 17, wherein the one or more failed tests are identified based at least in part on a test failure history of the device.

* * * * *